(12) United States Patent
Chauhan et al.

(10) Patent No.: US 11,304,151 B2
(45) Date of Patent: Apr. 12, 2022

(54) SYSTEM AND METHOD FOR MITIGATION OF INTERFERENCE

(71) Applicant: JIO PLATFORMS LIMITED, Ahmedabad (IN)

(72) Inventors: Devesh Chauhan, Mumbai (IN); Yashesh Buch, Mumbai (IN); Veera Sai Satyanarayana Prasad Marni, Mumbai (IN)

(73) Assignee: JIO PLATFORMS LIMITED, Ahmedabad (IN)

( * ) Notice: Subject to any disclaimer, the term of this patent is extended or adjusted under 35 U.S.C. 154(b) by 0 days.

(21) Appl. No.: 16/863,742

(22) Filed: Apr. 30, 2020

(65) Prior Publication Data
US 2020/0374812 A1 Nov. 26, 2020

(30) Foreign Application Priority Data

May 1, 2019 (IN) .............................. 201921017318

(51) Int. Cl.
*H04B 7/00* (2006.01)
*H04W 52/28* (2009.01)
*H04W 72/12* (2009.01)
*H04W 52/14* (2009.01)

(52) U.S. Cl.
CPC ....... *H04W 52/283* (2013.01); *H04W 52/143* (2013.01); *H04W 72/1247* (2013.01); *H04W 72/1273* (2013.01)

(58) Field of Classification Search
CPC ........... H04W 52/283; H04W 72/1247; H04W 72/1273; H04W 52/143

USPC ......................................................... 455/522
See application file for complete search history.

(56) References Cited

U.S. PATENT DOCUMENTS

| | | | |
|---|---|---|---|
| 9,374,189 B2* | 6/2016 | Wang | H04W 52/243 |
| 9,585,156 B2* | 2/2017 | Bhattad | H04L 5/1484 |
| 2004/0063433 A1* | 4/2004 | Garrison | H04W 16/00 |
| | | | 455/447 |

(Continued)

FOREIGN PATENT DOCUMENTS

| | | | | |
|---|---|---|---|---|
| WO | WO-2017030325 A1 * | 2/2017 | ............... | H04L 5/00 |
| WO | WO-2017033435 A1 * | 3/2017 | ............ | H04W 16/02 |

OTHER PUBLICATIONS

Chen (Multi-tone ABS for enhanced inter-cell interference coordination in LTE), 2015 (Year: 2015).*

*Primary Examiner* — April G Gonzales
(74) *Attorney, Agent, or Firm* — Klarquist Sparkman, LLP

(57) ABSTRACT

A system and method for mitigating at least one aggressor cell. The method comprises categorizing at least one user equipment connected to the at least one aggressor cell [102A, 102B, 102C, 102D] based on a position of the at least one user equipment within a coverage area of the at least one aggressor cell [102A, 102B, 102C, 102D]. The at least one user equipment positioned at the center of the coverage area of the at least one aggressor cell [102A, 102B, 102C, 102D] is scheduled for downlink transmission in at least one special subframe. The at least one aggressor cell [102A, 102B, 102C, 102D] reduces transmission power of the at least one special subframe by a pre-determined value and transmits the at least one special subframe to a first set of base stations [102E, 102F].

9 Claims, 3 Drawing Sheets

(56) References Cited

U.S. PATENT DOCUMENTS

| | | | |
|---|---|---|---|
| 2007/0177501 A1* | 8/2007 | Papasakellariou | H04W 24/00 370/229 |
| 2009/0201867 A1* | 8/2009 | Teo | H04W 72/082 370/329 |
| 2009/0252075 A1* | 10/2009 | Ji | H04W 56/00 370/312 |
| 2010/0311450 A1* | 12/2010 | Rinne | H04L 5/003 455/501 |
| 2011/0070824 A1* | 3/2011 | Braithwaite | H04W 16/26 455/25 |
| 2011/0176435 A1* | 7/2011 | Khandekar | H04W 72/042 370/252 |
| 2011/0255431 A1* | 10/2011 | Wang | H04L 5/0048 370/252 |
| 2011/0292846 A1* | 12/2011 | Hu | H04W 72/00 370/280 |
| 2012/0075989 A1* | 3/2012 | Roessel | H04W 72/04 370/230 |
| 2012/0082038 A1* | 4/2012 | Xu | H04L 5/0044 370/244 |
| 2012/0230232 A1* | 9/2012 | Ji | H04W 72/042 370/280 |
| 2012/0250565 A1* | 10/2012 | Zhang | H04J 11/0056 370/252 |
| 2012/0322453 A1* | 12/2012 | Weng | H04W 72/02 455/450 |
| 2013/0012249 A1* | 1/2013 | Centonza | H04W 72/0426 455/501 |
| 2013/0121189 A1* | 5/2013 | Bhattad | H04W 16/14 370/252 |
| 2013/0294268 A1* | 11/2013 | Xu | H04W 72/082 370/252 |
| 2013/0308485 A1* | 11/2013 | Krishnamurthy | H04W 72/082 370/252 |
| 2014/0177485 A1* | 6/2014 | Wang | H04L 1/1867 370/280 |
| 2015/0078220 A1* | 3/2015 | Hu | H04W 72/1231 370/280 |
| 2015/0098368 A1* | 4/2015 | Hu | H04W 28/16 370/280 |
| 2015/0350928 A1* | 12/2015 | Zhang | H04W 52/244 370/252 |
| 2016/0021621 A1* | 1/2016 | Wu | H04W 52/367 370/311 |
| 2018/0026714 A1* | 1/2018 | Miao | H04B 7/2653 370/337 |

\* cited by examiner

SYSTEM AND METHOD FOR MITIGATION OF INTERFERENCE

FIELD

The present invention relates generally to wireless communication networks, and more particular relates to a system and a method for mitigation of interference caused by aggressor cells facilitated by atmospheric ducting in wireless communication systems.

BACKGROUND

The following description of related art is intended to provide background information pertaining to the field of the invention. This section may include certain aspects of the art that may be related to various features of the present invention. However, it should be appreciated that this section be used only to enhance the understanding of the reader with respect to the present invention, and not as admissions of prior art.

A typical contemporary wireless network is deployed to provide various communication services including, but not limiting to, video, data, advertisement, content, messaging and broadcast. The network has usually multiple access networks to support communications for multiple users by sharing the available network resources. The earlier UTRAN is the radio access network (RAN) defined as part of the Universal Mobile Telecommunications System (UMTS), a third-generation (3G) mobile phone technology supported by the 3rd Generation Partnership Project (3GPP). The UMTS technology, which is the successor to Global System for Mobile Communications (GSM) technologies, currently supports various air interface standards, such as W-CDMA, Time Division-Code Division Multiple Access (TDCDMA), and Time Division-Synchronous Code Division Multiple Access (TDSCDMA). Also, the UMTS supports enhanced 3G data communications protocols such as the HSPA that provides higher data transfer speeds and capacity to be associated with UMTS networks.

With an increase in the demand for mobile data and voice access, these technologies are upgrading not only to meet the growing demand for access but also to enhance the user experience with a user equipment. One such advanced technology is Evolved Universal Terrestrial Radio Access (E-UTRA) which is a radio access network standard and is considered as a replacement of the UMTS and High-Speed Downlink Packet Access/High-Speed Uplink Packet Access (HSDPA/HSUPA) technologies covered under the 3GPP standards. The Evolved Universal Terrestrial Radio Access (E-UTRA) of the Long-Term Evolution (LTE) is an entirely new air interface system, unlike the High-Speed Packet Access (HSPA), which is unrelated and incompatible with the wireless code division multiple access (W-CDMA). In addition, the E-UTRA not only provides a higher data rate and lower latency but is also optimized for packet data. Thus, E-UTRA provides a single evolution path for providing an enhancement in the data speeds, and spectral efficiency and allowing the provision of more functionality. The voice services over LTE is referred to as VoLTE. The quality of voice through VoLTE is far superior compared to what is provided by legacy networks and termed as High Definition (HD) voice.

Typically, the macro network has a wide coverage and the cells are deployed at different altitudes depending on the site availability and geographical area. In Time Division Duplexing (TDD) mode, the uplink and downlink operate on the same frequency. Each licensed geographical area has a unique operating frequency, and, so, different areas may have different operating frequencies in same licensed band with overlapped full or partial bandwidth. In TDD-LTE systems, guard period is defined as an interval to switch from downlink to uplink and the duration of this guard period can vary from one OFDM symbol to ten OFDM symbols, thus, spanning a distance of 21 km to 214 km depending on the special subframe configuration. For higher downlink cell throughput, special subframe configuration should be such that it predominantly acts as a downlink subframe.

A common problem experienced in a TDD network is related to atmospheric ducting, usually experienced in the lower layers of Earth's atmosphere, wherein the vertical refractive index gradients in a way that radio signals are bent by the refraction and are guided or ducted through a horizontal layer that follows the curvature of the Earth and experiences less attenuation than they would if the ducts were not present. Thus, the duct essentially acts as an atmospheric dielectric waveguide and limits the spread of the signal to only the horizontal dimension. Therefore, it causes long-distance propagation of radio signals in bands that would normally be limited to line of sight. This results in Downlink radio signals from a base station reaching other base stations spaced 100s of km apart delayed in time (owing to propagation delay) such that they fall in Uplink slot of the far-end base stations. Such signals create significant interference on the far-end base stations which have by then switched to uplink slots and are expecting an uplink signal. The interference may be very high compared to uplink signals from the device as base stations have very high radiated signal power (63 dB or more) compared to transmission power (23 dBm) of devices, which severely impacts the performance of the entire network.

The interference level (or the transmitting power) also depends on the environment and it is observed that uplink KPI degradation is severe during the winter season due to Atmospheric Ducting resulting in Time of Flight (ToF) interference where downlink symbol transmission power lasts even after traversing more than 300 km distance in space. This ToF interference is from many aggressor cells from different neighbour cells which are located very far (more than 100 Kms). This results in disruption of services at victim cells.

While existing solutions provide a method to handle interference generated due to heterogeneous network deployments wherein the interference can be coordinated with the use of Almost Blank Subframes (ABS) by which macro eNodeB can reserve some subframes for small cells. The macro eNodeB only transmits synchronization and control signals in ABS, as a result, small cells get a transmission window which is interference-free and the user equipments can be served by small cells in ABS subframes, however, the solution requires a reduction in the capacity of the network which is not desirable. Another existing solution for mitigating the self-interference in TDD is by restricting the downlink data transmission in special subframe, done simply by changing the configuration of special subframe to SS5, however, this solution requires a 20% reduction in capacity which is not desirable.

Yet another existing solution describe resolving the uplink interference caused by user equipment terminals at base station receiver caused due to atmospheric ducting, they teach identifying the atmospheric ducting locations and subsequently modifying the amplitude and phase of the transmitting antenna elements electronically to minimize power transmission into the direction of a duct for resolving the same. Yet another existing solution teaches using antenna-based techniques for interference mitigation, by modifying the transmitting power of the Power Amplifier, such that the signals reaching far-end base stations have sufficiently low power to not cause any significant interference.

The existing solutions particularly fail to provide a solution for interfering terminals specific to Time Division Duplexing Wireless systems only and fail to provide a mitigation technique for the interference with minimal or no impact on the cell throughput with effective interference cancellation mechanism to avoid disrupting service to any user on TDD cells. Therefore, in the view of the limitations of the existing prior art solutions, there arises an imperative need in the art to overcome the limitations of prior existing solutions and to provide a system and a method to mitigate the aggressor cells causing the interference.

SUMMARY

This section is provided to introduce certain objects and aspects of the present invention in a simplified form that are further described below in the detailed description. This summary is not intended to identify the key features or the scope of the claimed subject matter.

In order to overcome at least a few problems associated with the known solutions as provided in the previous section, an object of the present invention is to provide a method and a system for mitigating at least one aggressor cell from a plurality of base stations connected to each other over a wireless communication network. Another object of the present invention is to provide a method and a system to mitigate the self-interference caused by the aggressor cells. Yet another object of the present invention is to provide a novel method and a system to mitigate the aggressor cells causing the interference so that effective interference cancellation mechanism can be adopted to avoid disrupting service to any user on TDD cells. Yet another object of the present invention is to provide a system and a method for automatic mitigation of aggressor cells. Yet another object of the present invention is to provide a system and a method for mitigation of aggressor cells wherein special subframe 7 of victim cell is used for uplink scheduling, thus, the system and the method will not throttle the uplink completely and therefore the user services are not be affected. Yet another object of the present invention is to provide a system and a method for mitigation of aggressor cells thereby enabling interference mitigation mechanism resulting in higher downlink and uplink cell throughputs, thus improving the customer experience. Yet another object of the present invention is to provide a system and a method to save the battery power by optimizing the connectivity, which will improve the success rate in wireless networks. Yet another object of the present invention is to provide a system and a method to maximize the utilization of available wireless bandwidth. Yet another object of the present invention is to provide a system and a method to handle high volume calls and data concurrently. Yet another object of the present invention is to provide a system and a method for providing users with the features and ability to receive seamless services simultaneously or sequentially consequently without any latency and call drops. Yet another object of the present invention is to provide a system and a method to reduce the probability of failure of service to users and improve the customer experience.

In order to achieve the aforementioned objectives, the present invention provides a method and system for mitigation of at least one aggressor cell. A first aspect of the present invention relates to a method for mitigating at least one aggressor cell from a plurality of base stations connected to each other over a wireless communication network, said plurality of base stations operating on time division duplexing (TDD). The method comprises categorizing at least one user equipment connected to the at least one aggressor cell based on a position of the at least one user equipment within a coverage area of the at least one aggressor cell, wherein the at least one user equipment is positioned at one of a center of the coverage area of the at least one aggressor cell and an edge of the coverage area of the at least one aggressor cell. Subsequently, the method encompasses scheduling the at least one user equipment positioned at the center of the coverage area of the at least one aggressor cell for downlink transmission in at least one special subframe, wherein the at least one special subframe further comprises of a downlink pilot time slot, an uplink pilot time slot and a guard period. Next, the method encompasses reducing transmission power of the at least one special subframe by a pre-determined value. Lastly, the method comprises transmitting the at least one special subframe from the at least one aggressor cell to a first set of base stations.

Another aspect of the present invention relates to a system for mitigating at least one aggressor cell from a plurality of base stations connected to each other over a wireless communication network, said plurality of base stations operating on time division duplexing (TDD). The system comprises at least one aggressor cell configured to categorize at least one user equipment connected to the at least one aggressor cell based on a position of the at least one user equipment within a coverage area of the at least one aggressor cell, wherein the at least one user equipment is positioned at one of a center of the coverage area of the at least one aggressor cell and an edge of the coverage area of the at least one aggressor cell. The at least one aggressor cell is also configured to schedule the at least one user equipment positioned at the center of the coverage area of the at least one aggressor cell for downlink transmission in at least one special subframe, wherein the at least one special subframe further comprises of a downlink pilot time slot, an uplink pilot time slot and a guard period. The at least one aggressor cell is also configured to reduce the transmission power of the at least one special subframe by a pre-determined value and to transmit the at least one special subframe from the at least one aggressor cell to a first set of base stations. The system further comprises of a first set of base stations connected to the plurality of base stations, said first set of base stations configured to receive the at least one special subframe from the at least one aggressor cell.

Yet another aspect of the present invention relates to a base station connected to a plurality of said base stations, said base station comprising a memory unit, and a processor connected to the said memory unit. The processor is configured to categorize at least one user equipment connected to the base station based on a position of the at least one user equipment within a coverage area of the base station, wherein the at least one user equipment is positioned at one of a center of the coverage area of the base station and an edge of the coverage area of the base station. The processor is also configured to schedule the at least one user equipment positioned at the center of the coverage area of the base station for downlink transmission in at least one special subframe, wherein the at least one special subframe further comprises of a downlink pilot time slot, an uplink pilot time slot and a guard period. The processor is further configured to reduce transmission power of the at least one special subframe by a pre-determined value. The system further comprises of a communication unit connected to the processor and the memory unit, said communication unit configured to transmit the at least one special subframe to the plurality of said base stations.

BRIEF DESCRIPTION OF DRAWINGS

The accompanying drawings, which are incorporated herein, and constitute a part of this invention, illustrate exemplary embodiments of the disclosed methods and systems in which like reference numerals refer to the same parts throughout the different drawings. Components in the drawings are not necessarily to scale, emphasis instead being placed upon clearly illustrating the principles of the present invention. Some drawings may indicate the components using block diagrams and may not represent the internal circuitry of each component. It will be appreciated by those skilled in the art that invention of such drawings includes the invention of electrical components, electronic components or circuitry commonly used to implement such components.

Figure 1:
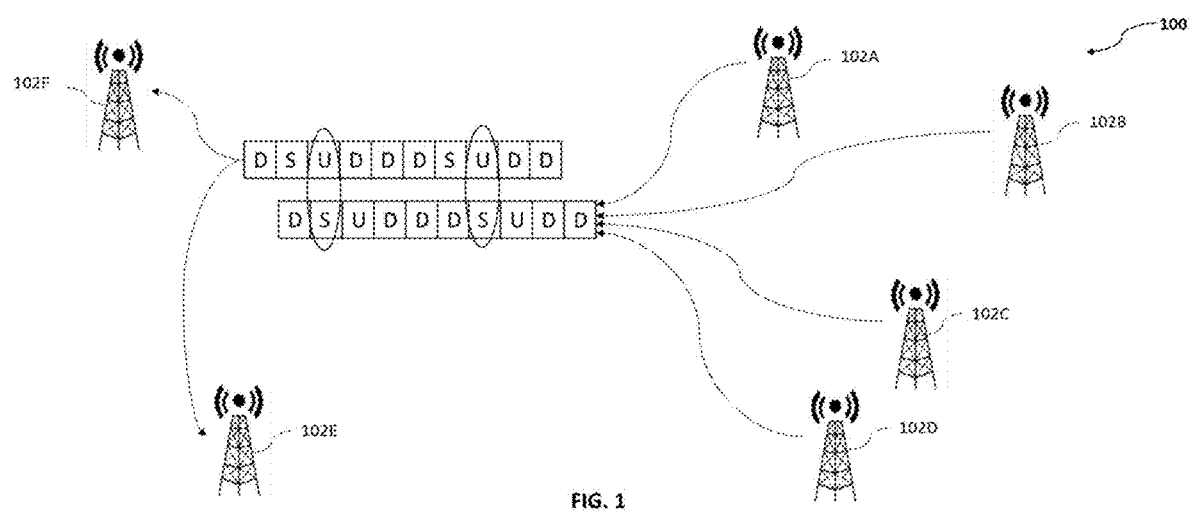
FIG. 1 illustrates an exemplary network architecture diagram [100] depicting a system for identifying at least one aggressor cell, in accordance with exemplary embodiments of the present invention.

The foregoing shall be more apparent from the following more detailed description of the invention.

BRIEF DESCRIPTION OF THE EXEMPLARY EMBODIMENTS

In the following description, for the purposes of explanation, various specific details are set forth in order to provide a thorough understanding of embodiments of the present disclosure. It will be apparent, however, that embodiments of the present disclosure may be practiced without these specific details. Several features described hereafter can each be used independently of one another or with any combination of other features. An individual feature may not address all of the problems discussed above or might address only some of the problems discussed above. Some of the problems discussed above might not be fully addressed by any of the features described herein.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed but could have additional steps not included in a figure. A process may correspond to a method, a function, a procedure, a subroutine, a subprogram, etc. When a process corresponds to a function, its termination can correspond to a return of the function to the calling function or the main function.

Furthermore, embodiments may be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a machine-readable medium. A processor(s) may perform the necessary tasks.

The word "exemplary" and/or "demonstrative" is used herein to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

As utilized herein, terms "component," "system," "platform," "node," "layer," "selector," "interface," and the like are intended to refer to a computer-related entity, hardware, software (e.g., in execution), and/or firmware. For example, a component can be a process running on a processor, a processor, an object, an executable, a program, a storage device, and/or a computer. By way of illustration, an application running on a server and the server can be a component. One or more components can reside within a process and a component can be localized on one computer and/or distributed between two or more computers.

Further, these components can execute from various computer-readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry which is operated by a software application or a firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that confers at least in part the functionality of the electronic components.

As used herein, the term "infer" or "inference" refers generally to the process of reasoning about or inferring states of the system, environment, user, and/or intent from a set of observations as captured via events and/or data. Captured data and events can include user data, device data, environment data, data from sensors, sensor data, application data, implicit data, explicit data, etc. Inference can be employed to identify a specific context or action or can generate a probability distribution over states of interest based on a consideration of data and events, for example. Inference can also refer to techniques employed for composing higher-level events from a set of events and/or data. Such inference results in the construction of new events or actions from a set of observed events and/or stored event data, whether the events are correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

In addition, the disclosed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, computer-readable carrier, or computer-readable media. For example, computer-readable media can include, but are not limited to, magnetic storage devices, e.g., hard disk; floppy disk; magnetic strip(s); optical disk (e.g., compact disk (CD), digital video disc (DVD), Blu-ray Disc™ (BD); smart card(s), flash memory device(s) (e.g., card, stick, key drive).

Moreover, terms like "user equipment" (UE), "mobile station," "mobile subscriber station," "access terminal," "terminal," "handset," and similar terminology refer to a wireless device utilized by a subscriber or user of a wireless communication service to receive and/or convey data associated with voice, video, sound, and/or substantially any data-stream or signalling-stream. Further, the foregoing terms are utilized interchangeably in the subject specification and related drawings. Likewise, the terms "local wireless communications cite," "access point" (AP), "base station," "Node B," "evolved Node B," "home Node B" (HNB), "home access point" (HAP), and the like are utilized interchangeably in the subject specification and drawings and refer to devices that can receive and transmit signal(s) from and to wireless devices through one or more antennas, or act as a wireless network component or apparatus that sends and/or receives data associated with voice, video, sound, and/or substantially any data-stream or signalling-stream between a set of subscriber stations—unless context warrants particular distinction(s) among the terms. Further, the data and signalling streams can be packetized or frame-based flows.

Furthermore, the terms "user," "subscriber," "customer," "consumer," "agent,", "owner," and the like are employed interchangeably throughout the subject specification and related drawings, unless context warrants particular distinction(s) among the terms. It should be appreciated that such terms can refer to human entities, or automated components supported through artificial intelligence, e.g., a capacity to make inference based on complex mathematical formulations, that can provide simulated vision, sound recognition, decision making, etc. In addition, the terms "wireless network" and "network" are used interchangeable in the subject application, unless context warrants particular distinction(s) among the terms.

As used herein, a "processor" or "processing unit" includes one or more processors, wherein processor refers to any logic circuitry for processing instructions. A processor may be a general-purpose processor, a special-purpose processor, a conventional processor, a digital signal processor, a plurality of microprocessors, one or more microprocessors in association with a DSP core, a controller, a microcontroller, a low-end microcontroller, Application Specific Integrated Circuits, Field Programmable Gate Array circuits, any other type of integrated circuits, etc. The processor may perform signal coding data processing, input/output processing, and/or any other functionality that enables the working of the system according to the present disclosure. More specifically, the processor or processing unit is a hardware processor.

As used herein, a "communication unit" or a "transceiver unit" may include at least one of a "transmitter unit" configured to transmit at least one data and/or signals to one or more destination and a "receiver unit" configured to receive at least one data and/or signals from one or more source. The "communication unit" or the "transceiver unit" may also be configured to process the at least one data and/or signal received or transmitted at the "communication unit" or the "transceiver unit". Also, the "communication unit" or the "transceiver unit" may further include, any other similar units obvious to a person skilled in the art, required to implement the features of the present invention.

As used herein, "memory unit", "storage unit" and/or "memory" refers to a machine or computer-readable medium including any mechanism for storing information in a form readable by a computer or similar machine. For example, a computer-readable medium includes read-only memory ("ROM"), random access memory ("RAM"), magnetic disk storage media, optical storage media, flash memory devices or other types of machine-accessible storage media.

As used herein, a "controller" or "control unit" includes at least one controller, wherein the controller refers to any logic circuitry for processing instructions. A controller may be a general-purpose controller, a special-purpose controller, a conventional controller, a digital signal controller, a plurality of microcontrollers, at least one microcontroller in association with a DSP core, a microcontroller, Application Specific Integrated Circuits, Field Programmable Gate Array circuits, any other type of integrated circuits, etc. The controller may perform signal coding, data processing, input/output processing, and/or any other functionality that enables the working of the system according to the present disclosure. More specifically, the controller or control unit is a hardware processor that comprises a memory and a processor. The memory is configured to store the modules and the processor is specifically configured to execute said modules to perform one or more processes which are described further below.

As used herein, a "plurality of base stations" may refer to two or more base stations or cells which provide a network coverage to a geographic coverage area, thus the geographic area served by the two or more cells is termed as coverage area of the two or more cells.

As used herein, a "first set of base stations" may refer to a set of one or more cells formed from the plurality of base stations. Particularly, the "first set of base stations" may refer to one or more victim cells experiencing interference from one or more aggressor cells. As used herein, "affected" may refer to experiencing interference caused by one or more aggressor cells at the one or more victim cells.

Hereinafter, exemplary embodiments of the present disclosure will be described in detail with reference to the accompanying drawings so that those skilled in the art can easily carry out the present disclosure.

Embodiments of the present disclosure may relate to a system and a method for mitigating at least one aggressor cell. The subject invention relates to a method and a system for automatic mitigation of an aggressor cells that may be causing interference to one or more victim cells in order to disrupt service to any user connected to the one or more victim cells. The solution of the present invention broadly encompasses modifying the transmission patterns from the base stations by making changes in the base station scheduler operating in Layer 2 and Layer 3 of the baseband protocol stack. The conventional techniques do not provide the resolution to mitigate the aggressor cells causing the interference. Compared to such techniques, various methods and apparatus described herein facilitate to mitigate the aggressor cells causing the interference in a wireless network.

Referring to FIG. 1, an exemplary diagram of the network architecture illustrating a system [100] for mitigating at least one aggressor cell, in accordance with the exemplary embodiment of the present invention. As shown in FIG. 1, the system [100] comprises a plurality of base stations [102A, 102B, 102C, 102D, 102E, 102F] are connected to each other over a wireless communication network. The plurality of base stations [102A, 102B, 102C, 102D, 102E, 102F] are configured to operate on time division duplexing (TDD). The base station may further comprise of a memory unit, a processor, and a communication unit, all the components are connected to each other and work in conjunction to achieve the objects of the present invention.

The wireless communication network may include a local wireless communication site (or base station), which can use a licensed radio spectrum operated and controlled by a wireless service provider. In another instance of the present invention, the network may be a wired network, a wireless network, or a combination thereof. The network may be a single network or a combination of two or more networks. Further, network provides a connectivity between the plurality of base stations [102A, 102B, 102C, 102D, 102E, 102F]. The invention encompasses that a user equipment (or a user equipment) operated by a subscriber within a coverage area typically communicates with a core network via the base station. The user equipment can register with the base station and accordingly, the subscriber's communication, e.g., voice traffic, data traffic, can be routed to the subscriber through the base station utilizing the licensed radio spectrum. The base station can employ a backhaul network, e.g., broadband wired or wireless network backbone, to route packet communication, e.g., voice traffic, data traffic, data, to the core network.

The system [100] of the present invention further comprises at least one aggressor cell [102A, 102B, 102C, 102D] and a first set of base stations [102E, 102F] connected to the at least one aggressor cell [102A, 102B, 102C, 102D]. The invention further encompasses that the at least one aggressor cell [102A, 102B, 102C, 102D] is configured to transmit at least one subframe to the first set of base stations [102E, 102F]. The at least one subframe further comprises of at least one downlink subframe, at least uplink subframe and at least one special subframe.

For instance, 3GPP has already defined frame structure Type 2 for Time division duplex (TDD). The supported uplink-downlink configurations are listed in below Table 1, where, for each subframe in a radio frame, 'D' denotes the subframe reserved for downlink transmissions, 'U' denotes the subframe reserved for uplink transmissions and 'S' denotes a special subframe.

TABLE 1

ILLUSTRATION OF TYPE 2 FOR TDD SUPPORTED UPLINK-DOWNLINK CONFIGURATIONS

| TDD Configuration | Downlink-to-Uplink Switch-point periodicity | Subframe Number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

The special subframe further comprises of Downlink Pilot Time Slot (DwPTS), Uplink Pilot Time Slot (UpPTS), and a guard period (GP). The DwPTS and UpPTS are always reserved for downlink and uplink transmission in a special subframe separated by a guard period (GP). Depending upon the length of the DwPTS, GP and UpPTS, special subframe configurations are defined and listed below in Table 2:

TABLE 2

ILLUSTRATION OF SPECIAL SUBFRAME CONFIGURATIONS

| Special Subframe Configuration | No. of Symbols in DwPTS | No. of Symbols for GP | No. of Symbols for UpPTS |
|---|---|---|---|
| 0 | 3 | 10 | 1 |
| 1 | 9 | 4 | 1 |
| 2 | 10 | 3 | 1 |
| 3 | 11 | 2 | 1 |
| 4 | 12 | 1 | 1 |
| 5 | 3 | 9 | 2 |
| 6 | 9 | 3 | 2 |
| 7 | 10 | 2 | 2 |
| 8 | 11 | 1 | 2 |

In a preferred instance of the present invention, the invention encompasses utilizing the special-subframe configuration numbered 7 for being the most spectrally efficient special-subframe configuration and allowing a 75% Transport Block (TB) transmission compared to a normal downlink sub-frame. The present invention also encompasses that the special-subframe configuration numbered 7 is followed by each of the plurality of base stations [102A, 102B, 102C, 102D, 102E, 102F] operating on TDD different circles. The invention also encompasses that each of the plurality of base stations [102A, 102B, 102C, 102D, 102E, 102F] in the network are uniquely identified using a global identity known as E-UTRAN Cell Global Identifier (ECGI). Accordingly, each of the plurality of base stations [102A, 102B, 102C, 102D, 102E, 102F] in the network is configured to broadcast its ECGI information through System Information Block 1 (SIB1) message. The other messages broadcasted by each of the plurality of base stations [102A, 102B, 102C, 102D, 102E, 102F] in the network carrying basic information defined by 3GPP for LTE are Synchronization signals (PSS and SSS), MIB and other SIB messages.

The invention further encompasses that the at least one aggressor cell [102A, 102B, 102C, 102D] is configured to categorize at least one user equipment connected to the at least one aggressor cell [102A, 102B, 102C, 102D] based on a position of the at least one user equipment within the at least one aggressor cell [102A, 102B, 102C, 102D], wherein the at least one user equipment is positioned at one of a center of the at least one aggressor cell [102A, 102B, 102C, 102D] and an edge of the at least one aggressor cell [102A, 102B, 102C, 102D]. The categorization of the at least one user equipment connected to the at least one aggressor cell [102A, 102B, 102C, 102D] may be based on at least one of a CQI (Channel Quality Index), a Power Headroom Report (PHR), a Reference Signal Received Power (RSRP), a Downlink Block Error rate (BLER) and an Uplink Block Error Rate (BLER).

Figure 2:
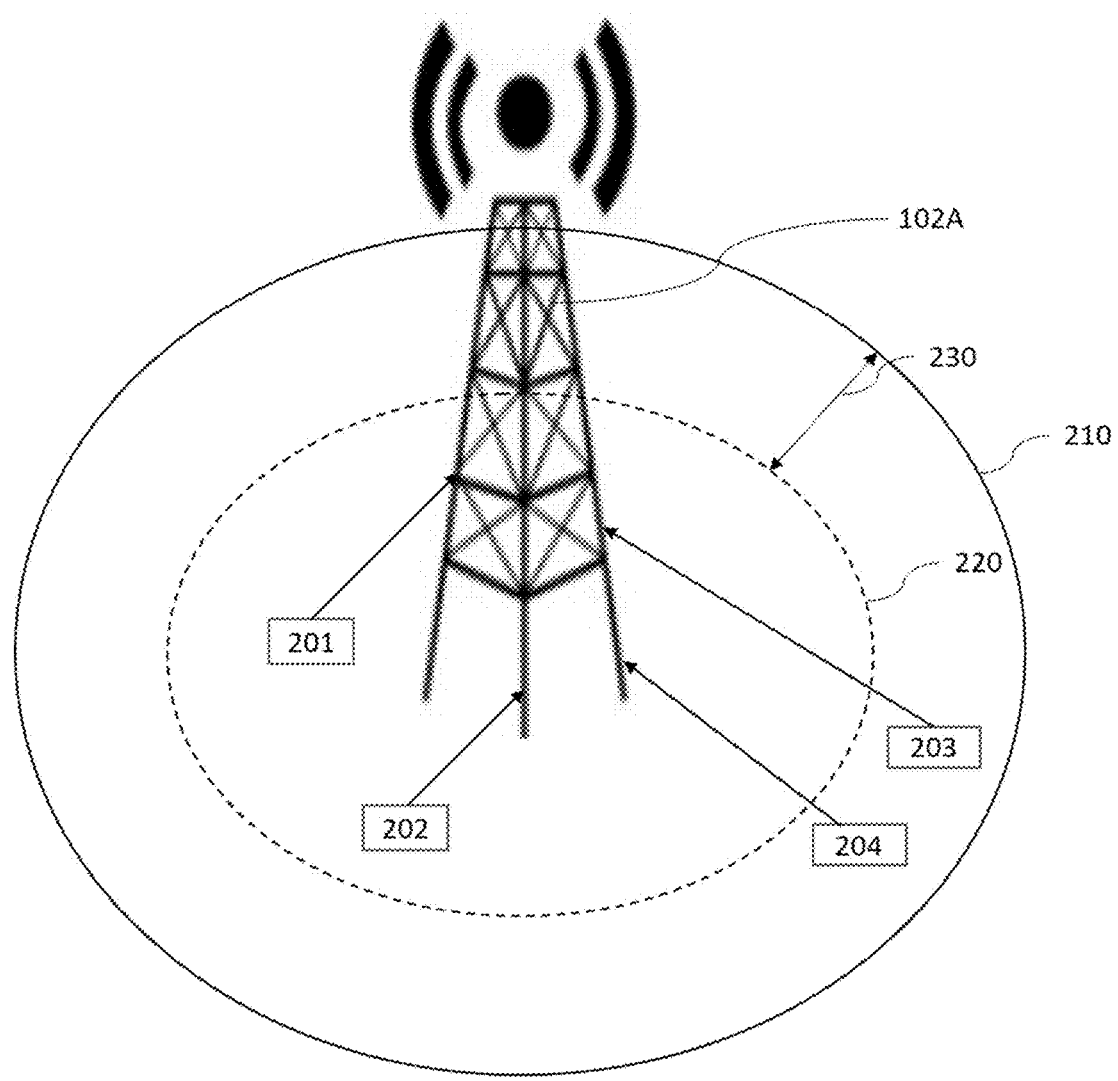
FIG. 2 illustrates an exemplary implementation of categorization of at least one user equipment connected to a base station and mitigation of interference caused by the base station, in accordance with exemplary embodiments of the present invention.

Referring to FIG. 2, an exemplary implementation of categorization of at least one user equipment connected to a base station and mitigation of interference caused by the base station, in accordance with exemplary embodiments of the present invention. Per FIG. 2, the base station [102A] is connected to at least one user equipment [201, 202, 203, 204]. The base station is further configured to determine a position for each of the at least one user equipment [201, 202, 203, 204] connected to the base station [102A] within a coverage area [210] of the base station [102A]. The base station [102A] further categorizes the at least one user equipment [201, 202, 203, 204] connected to the base station [102A] based on the position of the at least one user equipment [201, 202, 203, 204] within the coverage area [210] of the base station [102A]. In particular, the base station [102A] categorizes the at least one user equipment [201, 202, 203, 204] based on the user equipment being positioned at one of a center [220] and an edge [230] of the coverage area the base station [102A].

The invention further encompasses that the base station [102A] categorizes the at least one user equipment [201, 202, 203, 204] connected to the base station [102A] based on at least one of a CQI (Channel Quality Index), a Power Headroom Report (PHR), a Reference Signal Received Power (RSRP), a Downlink Block Error rate (BLER) and an Uplink Block Error Rate (BLER). For instance, the base station [102A] determines a threshold value for the Channel Quality Index as 10. Accordingly, the base station identifies that the user equipments [201, 202] with a CQI greater than 10 are positioned at the center of the coverage area of the base station [102A] and the user equipments [203, 204] with a CQI less than 10 are positioned at the edge [230] of the coverage area of the base station [102A].

Referring to FIG. 1, the at least one aggressor cell [102A, 102B, 102C, 102D] is further configured to schedule the at least one user equipment positioned at the center of the coverage area of the at least one aggressor cell [102A, 102B, 102C, 102D] for downlink transmission in at least one special subframe, wherein the at least one special subframe further comprises of a downlink pilot time slot, an uplink pilot time slot and a guard period. Further, the at least one user equipment positioned at the center of the at least one aggressor cell [102A, 102B, 102C, 102D] is scheduled for downlink transmission in the downlink pilot time slot (DwPTS) of the at least one special subframe.

In an instance of the present invention, the at least one user equipment positioned at the center of the coverage area of the at least one aggressor cell [102A, 102B, 102C, 102D] is scheduled in the at least one special subframe when the at least one aggressor cell [102A, 102B, 102C, 102D] is situated within a distance of 280 km from the first set of base stations [102E, 102F]. Since 1 OFDM symbol in a sub-frame corresponds to about 20 km, a 1 ms sub-frame comprising of 14 symbols corresponds to about 14×20=280 km. Resultantly, as the user equipments positioned at the edge of the coverage area of the at least one aggressor cell [102A, 102B, 102C, 102D] are not scheduled in the at least one special subframe, thus, further reducing the transmitting power of the at least one aggressor cell [102A, 102B, 102C, 102D] will decrease interference at the first set of base stations [102E, 102F].

In an event, the at least one aggressor cell [102A, 102B, 102C, 102D] is situated farther than a distance of 280 kms from the first set of base stations [102E, 102F], thus, implying that the interference is not coming from the special-subframe but from the downlink subframes preceding the special subframes (>1 ms), for instance, from 1st and 6th subframes. Accordingly, the at least one user equipment positioned at the center of the coverage area of the at least one aggressor cell [102A, 102B, 102C, 102D] is scheduled in the in the at least one special subframes as well as the downlink subframes 1 and 6, thus, maintaining the transmitting power of CRS/PSS/SSS/PBCH/PDCCH signals as earlier so that interference can be reduced.

Accordingly, the at least one aggressor cell [102A, 102B, 102C, 102D] is configured to schedule the at least one user equipment positioned at the edge of the coverage area of the at least one aggressor cell [102A, 102B, 102C, 102D] in the at least one downlink subframe other than the special subframe. In this regard, the present invention further encompasses that the at least one aggressor cell [102A, 102B, 102C, 102D] is configured to prioritize the at least one user equipment positioned at the edge of coverage area of the at least one aggressor cell [102A, 102B, 102C, 102D] over the at least one user equipment positioned at the center of the at least one aggressor cell [102A, 102B, 102C, 102D] in the at least one downlink subframe other than the special subframe. Accordingly, the transmitting the at least one downlink subframe from the at least one aggressor cell [102A, 102B, 102C, 102D] to the first set of base stations [102E, 102F]

The at least one aggressor cell [102A, 102B, 102C, 102D] is also configured to reduce transmission power of the at least one special subframe by a pre-determined value. In an instance of the present invention, the transmission power of at least one data resource element of the at least one special subframe is reduced in a range of 1-6 dB. In yet another instance, the transmission power of the at least one data resource element of the at least one special subframe is reduced in a step of 1 dB at a time, and accordingly, the transmission power of the at least one data resource element of the at least one special subframe can be reduced upto 6 dB. The present invention encompasses that the transmission power of the at least one downlink subframe is not modified, rather the transmission in these downlink subframes will happen with full transmission power. For instance, the present invention encompasses that the transmitting power of the reference signal, and other synchronization signals and PDCCH control channel is not modified to prevent any impact on RSRP.

The at least one aggressor cell [102A, 102B, 102C, 102D] is also configured to transmit the at least one special subframe from the at least one aggressor cell [102A, 102B, 102C, 102D] to a first set of base stations [102E, 102F]. Particularly, the at least one aggressor cell [102A, 102B, 102C, 102D] transmits the at least one special subframe for the at least one user equipment positioned at the center of the coverage area of the at least one aggressor cell [102A, 102B, 102C, 102D] and scheduled for downlink transmission in the at least one special subframe.

Accordingly, the at least one aggressor cell [102A, 102B, 102C, 102D] is configured to transmit the at least one downlink subframe from the at least one aggressor cell [102A, 102B, 102C, 102D] to the first set of base stations [102E, 102F]. Particularly, the at least one aggressor cell [102A, 102B, 102C, 102D] transmits the at least one downlink subframe for the at least one user equipment positioned at the edge of the coverage area of the at least one aggressor cell [102A, 102B, 102C, 102D] and scheduled for downlink transmission in the at least one downlink subframe.

The present invention further encompasses a base station connected to a plurality of said base stations, said base station comprising a memory unit, a processor and a communication unit. The processor is configured to categorize at least one user equipment connected to the base station based on a position of the at least one user equipment within a coverage area of the base station, wherein the at least one user equipment is positioned at one of a center of the base station and an edge of the base station. The processor categorizes the at least one user equipment connected to the at least one aggressor cell [102A, 102B, 102C, 102D] is based on at least one of a Channel Quality Index (CQI), a Power Headroom Report (PHR), a Reference Signal Received Power (RSRP), a Downlink Block Error rate (BLER) and an Uplink Block Error Rate (BLER).

The processor is also configured to schedule the at least one user equipment positioned at the center of the coverage area of the base station for downlink transmission in at least one special subframe, wherein the at least one special subframe further comprises of a downlink pilot time slot, an uplink pilot time slot and a guard period. Particularly, the processor is configured to schedule the at least one user equipment positioned at the center of the coverage area of the at least one aggressor cell [102A, 102B, 102C, 102D] in the downlink pilot time slot of the at least one special subframe.

In this regard, the present invention encompasses that the processor is configured to schedule the at least one user equipment positioned at the edge of the coverage area of the at least one aggressor cell [102A, 102B, 102C, 102D] for the downlink transmission in the at least one downlink subframe other than the special subframe. The processor may further be configured to prioritize the at least one user equipment positioned at the edge of the coverage area of the at least one aggressor cell [102A, 102B, 102C, 102D] over the at least one user equipment positioned at the centre of the at least one aggressor cell [102A, 102B, 102C, 102D] in the at least one downlink subframe other than the special subframe. The processor may, thus, transmit the at least one downlink subframe from the at least one aggressor cell [102A, 102B, 102C, 102D] to the first set of base stations [102E, 102F]. The processor is also configured to reduce the transmission power of the at least one special subframe by a pre-determined value. The processor may be configured to reduce the transmission power of at least one data resource element of the at least one special subframe in a range of 1-6 dB. In yet another instance, the transmission power of the at least one data resource element of the at least one special subframe is reduced in a step of 1 dB at a time, and accordingly, the transmission power of the at least one data resource element of the at least one special subframe can be reduced upto 6 dB.

The communication unit connected to the processor and the memory unit, said communication unit configured to transmit the at least one special subframe to the plurality of said base stations. The communication unit is further configured to transmit, to the plurality of other base stations, at least one another subframe, wherein the at least one another subframe further comprises of at least one downlink subframe, at least uplink subframe and at least one special subframe.

Figure 3:
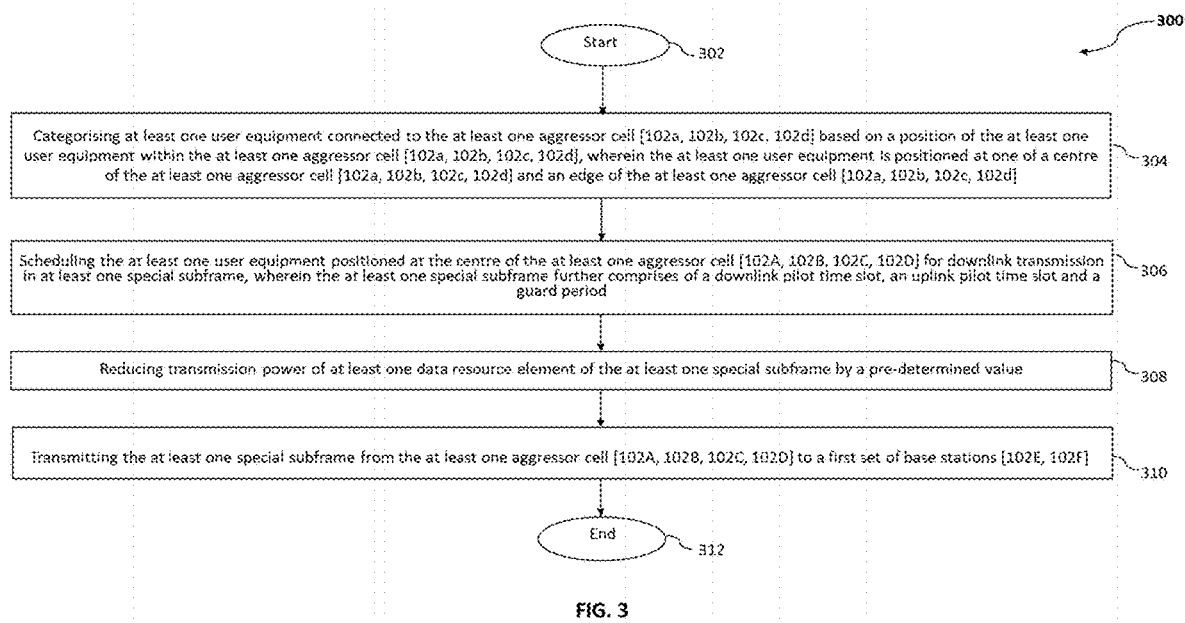
FIG. 3 illustrates an exemplary method flow diagram [300], depicting a method for mitigating the interference at aggressor cell, in accordance with exemplary embodiments of the present invention.

Referring to FIG. 3, illustrates an exemplary method flow diagram [300], depicting a method for mitigating at least one aggressor cell, in accordance with exemplary embodiments of the present invention. The method begins at step 302. The method comprises, at step 304, categorizing at least one user equipment connected to the at least one aggressor cell [102A, 102B, 102C, 102D] based on a position of the at least one user equipment within a coverage area of the at least one aggressor cell [102A, 102B, 102C, 102D], wherein the at least one user equipment is positioned at one of a center and an edge of the coverage area of the at least one aggressor cell [102A, 102B, 102C, 102D]. The categorization of the at least one user equipment connected to the at least one aggressor cell [102A, 102B, 102C, 102D] may be based on at least one of a CQI (Channel Quality Index), a Power Headroom Report (PHR), a Reference Signal Received Power (RSRP), a Downlink Block Error rate (BLER) and an Uplink Block Error Rate (BLER). For instance, the at least one aggressor cell [102A, 102B, 102C, 102D] determines a threshold value for the Channel Quality Index as 10. Accordingly, the at least one aggressor cell [102A, 102B, 102C, 102D] identifies that the user equipments with a CQI greater than 10 are positioned at the center of the coverage area of the at least one aggressor cell [102A, 102B, 102C, 102D] and the user equipments with a CQI less than 10 are positioned at the edge of the coverage area of the at least one aggressor cell [102A, 102B, 102C, 102D].

At step 306, the method comprises scheduling the at least one user equipment positioned at the center of the coverage area of the at least one aggressor cell [102A, 102B, 102C, 102D] for downlink transmission in at least one special subframe, wherein the at least one special subframe further comprises of a downlink pilot time slot, an uplink pilot time slot and a guard period. Further, the at least one user equipment positioned at the center of the at least one aggressor cell [102A, 102B, 102C, 102D] is scheduled for downlink transmission in the downlink pilot time slot (DwPTS) of the at least one special subframe.

The method of the present invention encompasses that the at least one user equipment positioned at the center of the coverage area of the at least one aggressor cell [102A, 102B, 102C, 102D] is scheduled in the at least one special subframe when the at least one aggressor cell [102A, 102B, 102C, 102D] is situated within a distance of 280 kms from the first set of base stations [102E, 102F]. Accordingly, the method of the present invention encompasses that, in an event, the at least one aggressor cell [102A, 102B, 102C, 102D] is situated farther than a distance of 280 km from the first set of base stations [102E, 102F], thus, implying that the interference is not coming from the special-subframe but from the downlink subframes preceding the special subframes (>1 ms), for instance, from 1st and 6th subframes. Accordingly, the at least one user equipment positioned at the center of the coverage area of the at least one aggressor cell [102A, 102B, 102C, 102D] is scheduled in the in the at least one special subframes as well as the downlink subframes 1 and 6.

The method of the present invention further encompasses that the at least one user equipment positioned at the edge of the coverage area of the at least one aggressor cell [102A, 102B, 102C, 102D] is scheduled in the at least one downlink subframe other than the special subframe. In this regard, the present invention further comprises prioritizing the at least one user equipment positioned at the edge of the coverage area of the at least one aggressor cell [102A, 102B, 102C, 102D] over the at least one user equipment positioned at the center of the at least one aggressor cell [102A, 102B, 102C, 102D], and transmitting the at least one downlink subframe from the at least one aggressor cell [102A, 102B, 102C, 102D] to the first set of base stations [102E, 102F].

At step 308, the method comprises reducing transmission power of the at least one special subframe by a pre-determined value. The at least one special subframe comprises of at least one data resource element (RE). In an instance of the present invention, the transmission power of the at least one data resource element of the at least one special subframe is reduced in a range of 1-6 dB. In yet another instance, the transmission power of the at least one data resource element of the at least one special subframe is reduced in a step of 1 dB at a time, and accordingly, the transmission power of the at least one data resource element of the at least one special subframe can be reduced upto 6 dB. The present invention encompasses that the transmission power of the at least one downlink subframe is not modified, rather the transmission in these downlink subframes will happen with full transmission power. For instance, the present invention encompasses that the transmitting power of the reference signal, and other synchronization signals and PDCCH control channel is not modified to prevent any impact on RSRP.

Lastly, at step 310, the method comprises transmitting the at least one special subframe from the at least one aggressor cell [102A, 102B, 102C, 102D] to a first set of base stations [102E, 102F]. Particularly, the at least one aggressor cell [102A, 102B, 102C, 102D] transmits the at least one special subframe for the at least one user equipment positioned at the center of the coverage area of the at least one aggressor cell [102A, 102B, 102C, 102D] and scheduled for downlink transmission in the at least one special subframe.

Accordingly, the method of the present invention encompasses that the at least one aggressor cell [102A, 102B, 102C, 102D] is configured to transmit the at least one downlink subframe from the at least one aggressor cell [102A, 102B, 102C, 102D] to the first set of base stations [102E, 102F]. Particularly, the at least one aggressor cell [102A, 102B, 102C, 102D] transmits the at least one downlink subframe for the at least one user equipment positioned at the edge of the coverage area of the at least one aggressor cell [102A, 102B, 102C, 102D] and scheduled for downlink transmission in the at least one downlink subframe. The method [300] is completed at step [312].

Thus, the present invention provides a novel solution for the technical problem of mitigating aggressor cell. Particularly, the solution of the present invention provides technical effect of mitigation of the interference caused by the aggressor cells with minimal or no impact on the cell throughput with effective interference cancellation to avoid disrupting service to any user on TDD cells, and thereby being able to connect and provide services hence improving the overall connectivity and user experience of the wireless network.

Although the present disclosure has been described with reference to certain preferred embodiments and examples thereof, other embodiments and equivalents are possible. Even though numerous characteristics and advantages of the present disclosure have been set forth in the foregoing description, together with functional and procedural details, the disclosure is illustrative only, and changes may be made in detail, within the principles of the disclosure to the full extent indicated by the broad general meaning of the terms. Thus, various modifications are possible of the presently disclosed system and process without deviating from the intended scope and spirit of the present disclosure.

We claim:

1. A method for mitigating at least one aggressor cell from a plurality of base stations connected to each other over a wireless communication network, said plurality of base stations operating on time division duplexing (TDD), said method comprising:

categorising at least one user equipment connected to the at least one aggressor cell based on a position of the at least one user equipment within a coverage area of the at least one aggressor cell, wherein the at least one user equipment is positioned at one of a centre and an edge of the coverage area of the at least one aggressor cell;

when the at least one user equipment is positioned at the centre of the coverage area, scheduling the at least one user equipment positioned at the centre of the coverage area of the at least one aggressor cell for downlink transmission in at least one special subframe, wherein the at least one special subframe further comprises a downlink pilot time slot, an uplink pilot time slot and a guard period;

when the at least one user equipment is positioned at the edge of the coverage area, scheduling the at least one user equipment positioned at the edge of the coverage area of the at least one aggressor cell in at least one downlink subframe;

reducing transmission power of the at least one special subframe by a pre-determined value; and transmitting the at least one special subframe from the at least one aggressor cell to a first set of base stations.

2. The method as claimed in claim 1, wherein at least one aggressor cell transmits at least one subframe, wherein the at least one subframe further comprises the at least one downlink subframe, at least uplink subframe and the at least one special subframe.

3. The method as claimed in claim 1, wherein categorising the at least one user equipment connected to the at least one aggressor cell is based on at least one of a Channel Quality Index (CQI), a Power Headroom Report (PHR), a Reference Signal Received Power (RSRP), a Downlink Block Error rate (BLER) and an Uplink Block Error Rate (BLER).

4. The method as claimed in claim 1, wherein the at least one user equipment positioned at the centre of the coverage area of the at least one aggressor cell is scheduled for downlink transmission in the downlink pilot time slot of the at least one special subframe.

5. The method as claimed in claim 4, further comprising:
prioritizing the at least one user equipment positioned at the edge of the coverage area of the at least one aggressor cell over the at least one user equipment positioned at the centre of the at least one aggressor cell in the at least one downlink subframe; and
transmitting the at least one downlink subframe from the at least one aggressor cell to the first set of base stations.

6. The method as claimed in claim 1, wherein the transmission power of at least one data resource element of the at least one special subframe is reduced in a range of 1-6 dB.

7. A system for mitigating at least one aggressor cell from a plurality of base stations connected to each other over a wireless communication network, said plurality of base stations operating on time division duplexing (TDD), said system comprising:
at least one aggressor cell configured to:
categorise at least one user equipment connected to the at least one aggressor cell based on a position of the at least one user equipment within a coverage area of the at least one aggressor cell, wherein the at least one user equipment is positioned at one of a centre of the coverage area of the at least one aggressor cell and an edge of the coverage area of the at least one aggressor cell;
when the at least one user equipment is positioned at the centre of the coverage area, schedule the at least one user equipment positioned at the centre of the coverage area of the at least one aggressor cell for downlink transmission in at least one special subframe, wherein the at least one special subframe further comprises of a downlink pilot time slot, an uplink pilot time slot and a guard period;
when the at least one user equipment is positioned at the edge of the coverage area, schedule the at least one user equipment positioned at the edge of the coverage area of the at least one aggressor cell in at least one downlink subframe;
reduce transmission power of the at least one special subframe by a pre-determined value; and
transmit the at least one special subframe from the at least one aggressor cell to a first set of base stations;
a first set of base stations connected to the at least one aggressor cell, said first set of base stations configured to:
receive the at least one special subframe from the at least one aggressor cell.

8. A base station connected to a plurality of other base stations, the base station comprising:
a memory unit;
a processor connected to the said memory unit, said processor configured to:
categorise at least one user equipment connected to the base station based on a position of the at least one user equipment within a coverage area of the base station, wherein the at least one user equipment is positioned at one of a centre of the base station and an edge of the base station;
when the at least one user equipment is positioned at the centre of the coverage area, schedule the at least one user equipment positioned at the centre of the coverage area of the base station for downlink transmission in at least one special subframe, wherein the at least one special subframe further comprises a downlink pilot time slot, an uplink pilot time slot and a guard period;
when the at least one user equipment is positioned at the edge of the coverage area, schedule the at least one user equipment positioned at the edge of a coverage area of at least one aggressor cell in at least one downlink subframe;
reduce transmission power of the at least one special subframe by a pre-determined value; and
a communication unit connected to the processor and the memory unit, said communication unit configured to:
transmit the at least one special subframe to the plurality of said base stations.

9. The base station as claimed in claim 8, wherein the communication unit is further configured to:
transmit, to the plurality of other base stations, at least one another subframe, wherein the at least one another subframe further comprises at least one downlink subframe, at least uplink subframe and at least one special subframe.

* * * * *